United States Patent
Iizuka et al.

(10) Patent No.: US 6,221,547 B1
(45) Date of Patent: Apr. 24, 2001

(54) ELECTRICALLY CONDUCTIVE RESIN COMPOSITION AND PHOTOSENSITIVE DRUM MADE THEREWITH

(75) Inventors: Munenori Iizuka, Kodaira; Youichi Nishimuro, Kunitachi; Kunio Machida, Tokyo, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/385,041

(22) Filed: Aug. 30, 1999

(30) Foreign Application Priority Data

Aug. 31, 1998 (JP) .................................................. 10-244631

(51) Int. Cl.$^7$ ....................................................... G03G 5/10
(52) U.S. Cl. ............................................. 430/69; 252/511
(58) Field of Search ................................ 430/69; 252/511

(56) References Cited

U.S. PATENT DOCUMENTS

| 4,064,075 | * | 12/1977 | Hull ........................................ | 252/511 |
| 4,337,179 | * | 6/1982 | Uejo et al. ............................. | 252/511 |
| 4,585,578 | * | 4/1986 | Yonahara et al. .................... | 252/511 |
| 4,702,859 | | 10/1987 | Shimizu et al. ...................... | 252/511 |
| 5,128,091 | | 7/1992 | Agur et al. ........................... | 264/512 |
| 5,277,855 | | 1/1994 | Blackmon et al. ................... | 264/103 |
| 5,591,382 | * | 1/1997 | Nahass et al. ....................... | 252/511 |
| 5,652,077 | * | 7/1997 | Obinata ................................. | 430/69 |
| 5,712,067 | * | 1/1998 | Kawata ................................. | 430/69 |

FOREIGN PATENT DOCUMENTS 36 44 773 A1    10/1987   (DE) .

OTHER PUBLICATIONS

Database WPI, XP–002124504 (JP–4–149907) May 22, 1991.
Database WPI, XP–002124505 (JP 2–201811) Aug. 10, 1990.
Database WPI, XP–002124506 (KR 8 900 045) Mar. 6, 1989.
Patent Abstracts of Japan, V14, N303 (P–1070) Jun. 29, 1990 (JP 2–097966).
Patent Abstracts of Japan, V14, N40 (P–995) Jan. 25, 1990 (JP 1–273052).

* cited by examiner

*Primary Examiner*—Roland Martin
(74) *Attorney, Agent, or Firm*—Sughrue, Mion, Zinn, Macpeak & Seas, PLLC

(57) ABSTRACT

The invention relates to a photosensitive drum based on a cylindrical base which is made with an electrically conductive resin composition which comprises a polyamide resin as the resin component and an electrically conductive material, said polyamide resin being one selected from the group consisting of polyamide resins obtained from m-xylylenediamine and adipic acid, polyamide resins obtained from ε-caprolactam, and mixtures thereof. The cylindrical base for the photosensitive drum has good surface smoothness as well as good mechanical strength, and it can be obtained easily by injection molding or the like from said resin composition.

2 Claims, 1 Drawing Sheet

ELECTRICALLY CONDUCTIVE RESIN COMPOSITION AND PHOTOSENSITIVE DRUM MADE THEREWITH

BACKGROUND OF THE INVENTION

The present invention relates to an electrically conductive resin composition suitable for use as a material to form the cylindrical base of the photosensitive drum in electrophotographic machines such as copying machines, facsimiles, and printers. The present invention relates also to a photosensitive drum whose cylindrical base is made with the electrically conductive resin composition.

Copying machines, facsimiles, and printers employ the electrostatic recording process. The process for printing consists of uniformly charging the surface of a photosensitive drum, projecting an image onto the charged surface through an optical system so that charge disappears from the exposed part, thereby forming a latent image thereon, supplying the latent image with a toner, thereby forming a toner image due to electrostatic attraction between them, and transferring the toner image to a recording medium such as paper, OHP, and photographic paper.

The above-mentioned electrostatic recording process usually employs a photosensitive drum constructed as shown in FIG. 1.

Specifically, it consists of a cylindrical base 1 having good electrical conductivity, two flanges 2a and 2b fitted into both ends of the cylindrical base 1, and a photosensitive layer 3 formed on the peripheral surface of the cylindrical base 1. As shown in FIG. 1, the photosensitive drum is usually supported by two axes 4 and 4 fixed to the main body 10 of the electrophotographic apparatus and the axes are inserted into the holes 5 and 5 formed in the flanges 2a and 2b, so that the photosensitive drum turns freely. On the periphery of one flange 2b is formed a gear 6 which engages with a gear 7 connected to a drive motor. The cylindrical base 1 thus constituted is allowed to rotate.

The cylindrical base 1 mentioned above is conventionally made with aluminum alloy because of its light weight, good machinability, and high electrical conductivity.

Unfortunately, the cylindrical base of aluminum alloy needs high-precision machining if it is to meet stringent requirements for dimensions and surface roughness. It also needs machining for the holes into which the flanges 2a and 2b are fitted. Moreover, it may need surface treatment to prevent surface oxidation. These added steps lead to a high production cost. Therefore, aluminum alloy is not necessarily a satisfactory raw material for the cylindrical base to constitute the photosensitive drum.

There has been proposed an idea of making the cylindrical base 1 from a resin composition composed mainly of polyphenylene sulfide (PPS) resin by injection molding. The molding process is comparatively easy and the resulting cylindrical base is light in weight and superior in chemical and heat resistance. In addition, the cylindrical base 1 can be molded integrally with either of the flanges 2a and 2b from the same resin composition.

When the above-mentioned PPS-based resin composition is made into the cylindrical base 1 for the photosensitive drum, it is usually incorporated with carbon black in an amount more than 20% by weight so that it is given electrical conductivity. Unfortunately, any PPS resin composition with such a high content of carbon black is very brittle and hence it is incorporated with a reinforcement such as glass fiber so that the resulting cylindrical base has a required strength.

The disadvantage of the PPS resin composition incorporated with carbon black and glass fiber is extremely poor in flowability in the molten state. Thus the resulting cylindrical base is poor in surface smoothness because the finished surface of the mold is not completely transferred at the time of injection molding. This poses a serious problem in the subsequent steps of applying a photosensitive material to the surface, thereby forming a photosensitive layer.

SUMMARY OF THE INVENTION

The present invention was completed in view of the foregoing. Thus, it is an object of the present invention to provide an electrically conductive resin composition which can be easily made by injection molding into a cylindrical base of a photosensitive drum which has good surface smoothness and high mechanical strength. It is another object of the present invention to provide a photosensitive drum formed on the cylindrical base made with the above-mentioned electrically conductive resin composition.

The electrically conductive resin composition of the present invention gives a molded product (or cylindrical base) having good mechanical strength and stiffness as well as good surface smoothness. Thus, the present invention makes it possible to produce a high-performance photosensitive drum (light in weight and high in strength) easily without requiring complex processes.

DETAILED DESCRIPTION OF THE PREFERRED EMBODIMENTS

Figure 1:
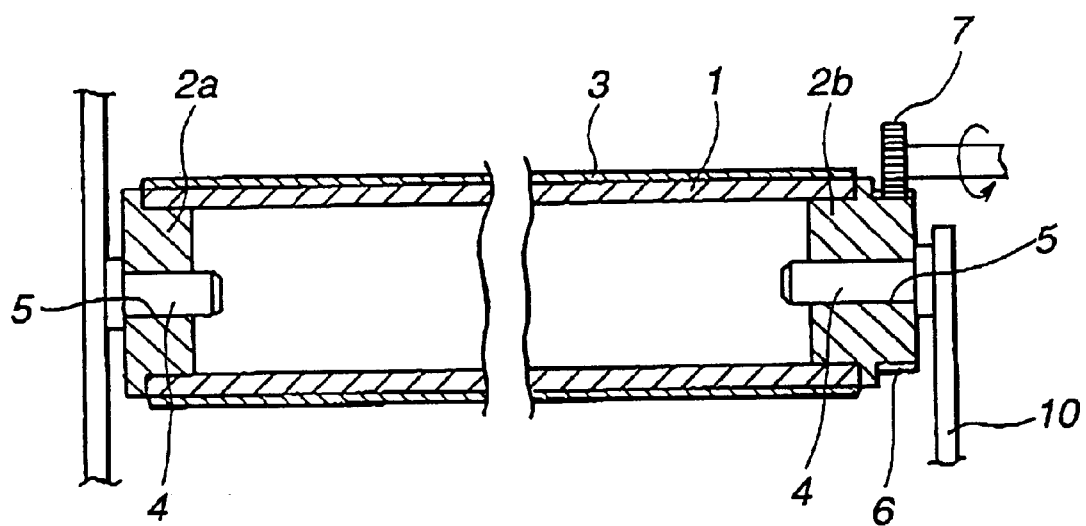
FIG. 1 is a schematic sectional view showing one example of photosensitive drums.

In order to address the above-mentioned problems, the present inventors carried out a series of research which led to the finding that a polyamide resin obtained from m-xylylenediamine and adipic acid has good heat resistance, good chemical resistance, high mechanical strength and small dimensional change after injection molding. The present inventors also found that a polyamide resin obtained from ε-caprolactam has good heat resistance, good chemical resistance, high mechanical strength and good injection moldability.

These properties are desirable for the resin to be formed into the cylindrical base of the photosensitive drum. Since the polyamide resins have a slower crystallizing rate than any other crystalline resins, the resins easily form a skin layer on the surface of the molded product even when they are incorporated with an electrically conductive material such as carbon black and a reinforcing inorganic filler such as whisker to improve mechanical properties such as strength and stiffness. In other words, the resulting molded product has improved strength and stiffness as well as good surface smoothness.

The present invention is based on these findings.

Thus, the present invention covers an electrically conductive resin composition which comprises a polyamide resin as the resin component and an electrically conductive material, said polyamide resin being one selected from the group consisting of polyamide resins obtained from m-xylylenediamine and adipic acid, polyamide resins obtained from ε-caprolactam, and mixtures thereof.

The present invention also covers a photosensitive drum made up of a cylindrical base and a photosensitive layer formed on its peripheral surface, wherein said cylindrical base is formed from the electrically conductive resin composition defined above.

The invention will be explained in more detail in the following.

According to the present invention, the electrically conductive resin composition contains as the resin component a polyamide resin which is obtained from m-xylylenediamine and adipic acid and/or a polyamide resin which is obtained from ε-caprolactam, and the photosensitive drum has a cylindrical base formed from the electrically conductive resin composition.

The polyamide resin as the resin component of the electrically conductive resin composition is one which is produced from m-xylylenediamine and adipic acid through polycondensation reaction and/or one which is produced from ε-caprolactam through ring opening polymerization reaction. The former is generally referred to as nylon MXD6. The latter is generally referred to as nylon-6.

The electrically conductive resin composition of the present invention contains the specific polyamide resin (nylon MXD6 and/or nylon-6) as the resin component. Nylon MXD6 and/or nylon-6 may be used in combination with any other resin if necessary. The other resin is not specifically restricted so long as the object of the present invention is achieved. Preferred examples of such resins are polyamide resins including nylon-11, nylon-12, nylon-46, nylon-66, nylon-610, nylon-612, nylon-1212, and copolymers thereof. The amount of these resins are not specifically restricted, although it should preferably be such that the nylon MXD6, nylon-6 or the mixture thereof accounts for at least 30–100% by weight, particularly 40–100% by weight of the resin composition.

The resin composition of the present invention is incorporated with an electrically conductive material so that it has electrical conductivity. The electrically conductive material is not specifically restricted so long as it can be uniformly dispersed into the above-mentioned resin. It includes, for example, carbon black, graphite powder, aluminum powder, copper powder, nickel powder, and electrically conductive glass powder, with carbon black being especially preferred. The amount of the electrically conductive material is not specifically restricted; however, it should preferably be 5–30% by weight, particularly 5–20% by weight of the resin composition, so that the resulting molded product has a surface resistance lower than $10^4$ Ω/□, particularly lower than $10^2$ Ω/□ (ohm/square).

The resin composition of the present invention may be incorporated with an inorganic filler in the form of fiber for the purpose of reinforcement and extension. The fibrous inorganic filler includes carbon fiber, glass fiber, and whisker (conductive or non-conductive). In the case where conductive fiber is used, it is possible to reduce the amount of the above-mentioned electrically conductive material.

The amount of the filler may vary depending on its kind and the length and diameter of fiber and hence it is not specifically restricted. It is usually 1–30% by weight, preferably 5–25% by weight, more preferably 10–25% by weight in the composition. When incorporated with the filler mentioned above, the resin composition of the present invention gives a molded product exhibiting improved strength and stiffness without sacrificing its surface smoothness.

The electrically conductive resin composition of the present invention may be incorporated, in addition to the above-mentioned electrically conductive material and filler, with any known additives, such as polytetrafluoroethylene (PTFE), silicone, molybdenum disulfide ($MoS_2$), and metal soap, in a proper amount. The filler may be surface-treated with a silane or titanate coupling agent in common use.

The photosensitive drum of the present invention is shown in FIG. 1. It consists of a cylindrical base 1 and a photosensitive layer 3 formed on its peripheral surface. According to the present invention, the cylindrical base 1 is made with the above-mentioned electrically conductive resin composition.

In the case of the photosensitive drum shown in FIG. 1, the cylindrical base 1 has individually molded flanges 2a and 2b fitted and fixed to both ends thereof. According to the present invention, however, at least either one of the flanges 2a and 2b can be molded integrally with the cylindrical base 1. In addition, the flange may have the drive gear 6 formed thereon because it is molded from the electrically conductive resin composition (filled with an inorganic reinforcement) and hence it has high strength and stiffness.

The molding of the cylindrical base 1 from the electrically conductive resin composition may be accomplished in any way, although injection molding is preferable. Molding conditions, such as temperature and pressure, may be the same as those employed for nylon MXD6 and/or nylon-6.

The peripheral surface of the cylindrical base 1 should preferably be smooth as defined below in terms of surface roughness.

Center line average roughness (Ra):

smaller than 0.8 μm, particularly smaller than 0.2 μm.

Maximum height (Rmax):

smaller than 1.6 μm, particularly smaller than 0.8 μm.

10-point average roughness (Rz):

smaller than 1.6 μm, particularly smaller than 0.8 μm.

If these Ra, Rmax, Rz of the surface are bigger than specified above, the surface irregularities of the cylindrical base 1 manifest themselves in the photosensitive layer 3, resulting in a poor image. The requirement for surface roughness is easily achieved if the electrically conductive resin composition of the present invention is used even though it is incorporated with a reinforcing inorganic filler.

The cylindrical base 1, with either one of flanges 2a and 2b molded integrally, is subsequently provided by fitting with the other flange which has been molded separately. The second flange may be molded from any material such as metal, electrically conductive resin, and non-electrically conductive resin. However, it is desirable to use the same electrically conductive resin composition as used for the cylindrical base 1, from the standpoint of balance between strength and conductivity. The fitted flange may be fastened with an adhesive if necessary.

To complete the photosensitive drum of the present invention, the cylindrical base 1 is provided with a photosensitive layer 3 on its peripheral surface. This photosensitive layer may be formed from any known material with a known composition and it may have any known layer structure.

Incidentally, the photosensitive drum of the present invention is not necessarily restricted to the one shown in FIG. 1. For example, it may be supported by axes projecting from the flanges in place of axes inserted into holes 5 in the flanges 2a, 2b. The shape of the flanges 2a, 2b and the method of driving the photosensitive drum may be modified adequately within the scope of the present invention.

EXAMPLE

The invention will be described in more detail with reference to the following embodiments and comparative examples, which are not intended to restrict the scope of the invention.

Electrically conductive resin compositions were prepared in the usual way from the components shown in Table 1. Each composition was made, by injection molding, into the cylindrical base for the photosensitive drum, measuring 30 mm in outside diameter, 230 mm long, and 2 mm in wall thickness. Injection molding was carried out under the same condition for all the compositions.

The resulting cylindrical base was examined for surface roughness (center line average roughness Ra, maximum height Rmax, and 10-point average roughness Rz). Measurements were carried out according to JIS B0601 by using "Surfcon" (from Tokyo Seimitsu Co., Ltd.). The results are shown in Table 1.

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| Components (wt %) | | | | | | | | | |
| PA66[*1] | 55 | 41 | — | — | 41 | — | 82 | 78 | — |
| PA6[*2] | — | — | — | 55 | 35 | 78 | — | — | — |
| PAMXD6[*3] | 23 | 35 | 78 | 23 | — | — | — | — | — |
| PPS[*4] | — | — | — | — | — | — | — | — | 55 |
| Carbon black | 12 | 9 | 12 | 12 | 9 | 12 | 18 | 12 | 20 |
| Conductive whisker[*5] | 10 | 15 | 10 | 10 | 15 | 10 | — | 10 | — |
| Glass fiber | — | — | — | — | — | — | — | — | 25 |
| Surface roughness | | | | | | | | | |
| Ra (μm) | 0.05 | 0.06 | 0.04 | 0.05 | 0.06 | 0.05 | 0.22 | 0.44 | 0.79 |
| Rmax (μm) | 0.56 | 0.95 | 0.48 | 0.75 | 1.05 | 0.55 | 3.92 | 2.73 | 5.44 |
| Rz (μm) | 0.32 | 0.54 | 0.21 | 0.33 | 0.95 | 0.42 | 2.24 | 2.59 | 3.36 |

[*1]: nylon-66 (containing 18% carbon black), "Stattokon R" from Kawasaki Seitetsu Co., Ltd.
[*2]: nylon-6, "UBE-nylon" from Ube Kosan Co., Ltd.
[*3]: nylon MXD6, "Rany" from Mitsubishi Kagaku Co., Ltd.
[*4]: polyphenylene sulfide
[*5]: "Dentol" from Otsuka Kagaku Co., Ltd.

It is noted from Table 1 that the cylindrical base for the photosensitive drum is superior in surface smoothness only when it is formed from the electrically conductive resin composition pertaining to the present invention.

What is claimed is:

1. A photosensitive drum comprising; a cylindrical base and a photosensitive layer formed on the peripheral surface thereof, said cylindrical base formed of an electrically conductive resin composition comprising; a polyamide resin as the resin component and an electrically conductive material, said polyamide resin including slow crystallizing polyamide resin and another polyamide resin, said slow crystallizing polyamide resin being one selected from the group consisting of polyamide resins obtained from m-xylylenediamine and adipic acid, polyamide resins obtained from ε-caprolactam, and mixtures thereof.

2. A photosensitive drum as defined in claim 1, wherein a peripheral surface of the cylindrical base has a center line average roughness (Ra) of less than 0.8 μm, a maximum height (Rmax) of less than 1.6 μm and a 10-point average roughness (Rz) of less than 1.6 μm as measured according to JIS B0601.

* * * * *